United States Patent Office 3,504,553
Patented Apr. 7, 1970

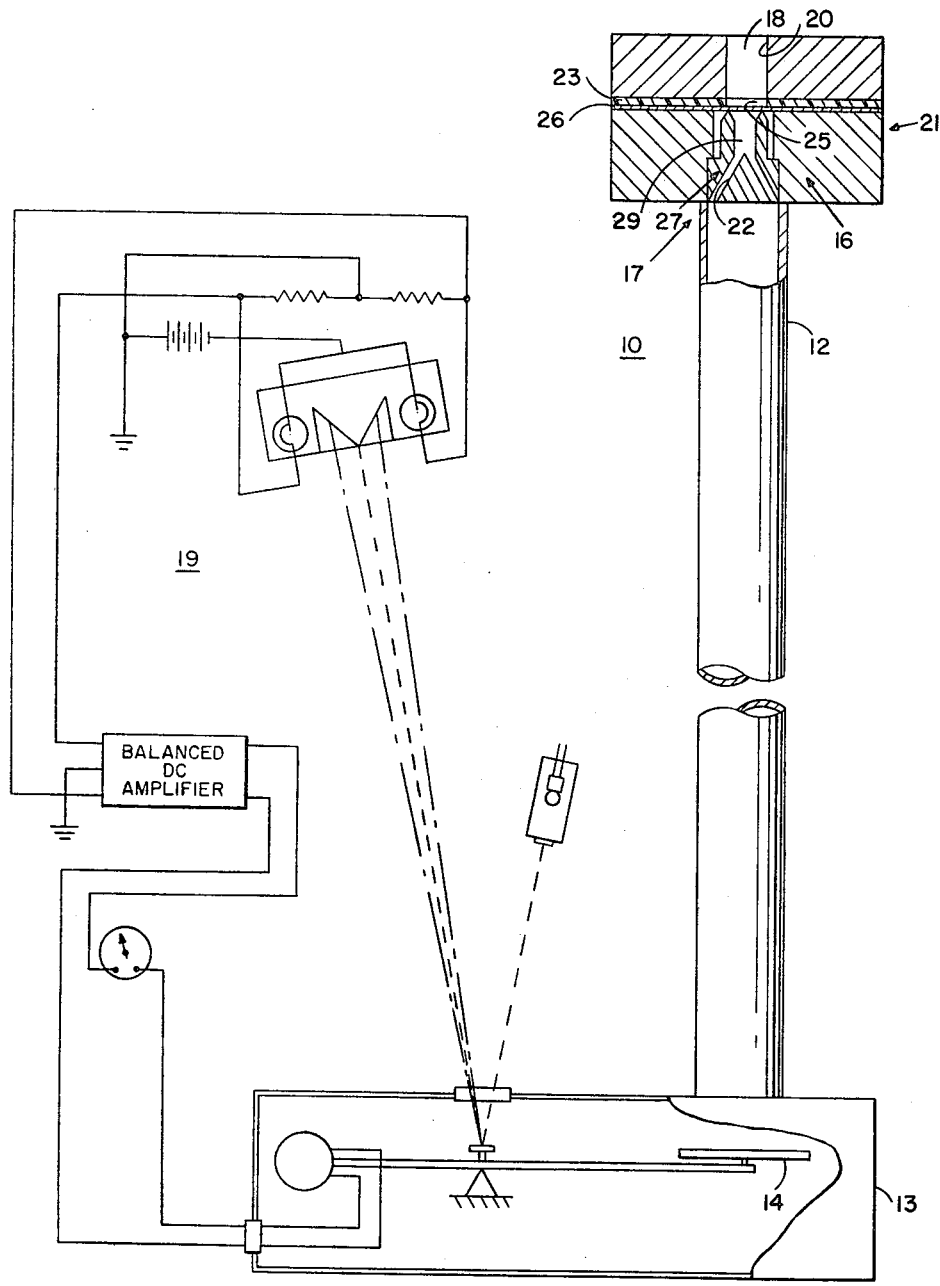

3,504,553
APPARATUS FOR DETERMINING PARTICLE SIZE AND IMPROVED FEED MECHANISM THEREFOR
Kenyon Stevenson, Huntsville, Ala., Martin L. Essick, Newport News, Va., and Earl D. Rosserman, Grant, Ala., assignors, by mesne assignments, to the United States of America as represented by the Secretary of the Army
Filed May 6, 1968, Ser. No. 726,937
Int. Cl. G01n 15/02
U.S. Cl. 73—432                                    4 Claims

ABSTRACT OF THE DISCLOSURE

A feed mechanism for use in an apparatus for determining the particle size distribution of powdered or finely divided materials such as particles which form solid propellants for use in rockets. The feed mechanism is disposed to inject the powder to be measured into a settling chamber as a dispersion of single crystals in the settling medium. The particles to be measured are placed in a sample chamber, on a thin diaphragm, carried in the sample chamber above a deagglomerator which is in the form of one or more passages in communication with the sample chamber and a settling chamber. Upon pressurization of the sample chamber, the diaphragm ruptures, permitting the sample to enter the deagglomerator with significantly reduced crystal breakage.

---

In solid propellant rockets the burning rate is an important parameter that is generally controlled, within limits, by the particle size or particle size distribution of the oxidizer, such as, for example, ammonium perchlorate. Burning rates are measurable with high accuracies, whereas particle size distributions are difficult to determine accurately or reproducibly.

There are a number of difficulties associated with the different methods for measuring particle sizes of powders. The most obvious way is with a microscope, using a calibrated eyepiece or a photomicrograph taken at a known magnification. This is practical for individual particles and for powder samples having a narrow range or particles sizes. However, when a wide particle size range is being measured, the problem of obtaining a statistical representation is almost insurmountable. Surface area measurement by such methods as permeation and absorption are limited in utility because they give only single values, and, therefore, do not consider the particle size distribution. Still another particle size method used by the propellant industry is based upon the measurement of a change in electrical resistivity of an electrolyte containing the solid particles to be analyzed. The primary problem of its use with powders, such as, for example, ammonium perchlorate is that of obtaining a conductive electrolyte whose solubility for the ammonium perchlorate is sufficiently small. Sedimentation techniques in a liquid medium are frequently used for particle size. However, gravitational sedimentation methods sometime require up to 24 hours to complete the determination for very small particles. The time requirement is dependent largely upon the density of the sedimentation medium and the length of the sedimentation column. Centrifugal sedimentation techniques decrease the time required, but the equipment must be started and stopped frequently to obtain readings. Thus, inadvertent agitation of the sedimentation medium and the reproducibility of the centrifuge speeds and action times are sources of errors.

SUMMARY OF INVENTION

A feed mechanism for injecting finely divided particles into a sedimentation chamber with minimum breakage of the particles during the injection thereof. The feed mechanism includes a sample chamber and one or more agglomeration gaps or passages communicating to a settling chamber. The sample chamber is provided with a diaphragm between it and the deagglomeration passage or passages. The diaphragm is disposed for support of sample particles thereon and for rupturing responsive to pressurization of the sample chamber for injecting the particles into the sedimentation chamber.

It is an object of the present invention to provide a feed mechanism for utilization with apparatus for determining the particle size distribution of powdered or finely divided materials.

It is another object of the present invention to provide such a feed mechanism for injecting samples of the particles into a sedimentation chamber with significantly reduced crystal breakage.

It is yet another object of the present invention to provide such a feed mechanism with a sample chamber disposed for pressurization for injecting the sample into the sedimentation chamber.

Other objects and advantages of the present invention will be more readily apparent from the following description and accompanying drawing.

BRIEF DESCRIPTION OF THE DRAWING

The figure is a diagrammatic illustration of a sedimentation apparatus including the feed mechanism therefor.

DETAILED DESCRIPTION OF THE DRAWING

As shown in the figure, a sedimentation apparatus 10 is shown to include a tower 12 comprising a settling chamber provided with a collecting means 14 positioned to receive the particles as they are ejected from a feed mechanism 16 positioned in the upper portion 17 of tower 12.

The collecting means, which may be in the form of a weighting pan is disposed at the base of the tower on one end of a lever arm which may be pivoted in a suitable manner and completely self-contained within a pressure tight enclosure 13. The other end of the lever arm may be provided with means for applying a restoring torque or counter torque on the lever arm to maintain equilibrium on the lever arm as the initial torque due to the weight of powder accumulating on the collecting means increases.

An electric signal indicating means 19 is positioned adjacent the tower for applying the electric signal necessary for producing the restoring torque on the lever arm.

The sedimentation apparatus including the electric signal generating means 19 is similar to that disclosed in Patent No. 2,597,899, issued to Robert E. Payne on May 27, 1952 and assigned to the Sharples Corporation; however, the present invention relates to an improved feed mechanism therefor.

The feed mechanism is shown schematically in the figure to include a housing 21 having an inlet 18 for a gaseous medium, such as air, to be injected into a sample chamber 20. The housing is further provided with a deagglomerator means 27 disposed intermediate tower 12 and sample chamber 20.

The deagglomerator may be provided with an entrance 29 having a plurality of passages 22 communicating therewith, or a single passage 22 arranged in an annulus and disposed in communication with the deagglomerator entrance and the settling chamber.

A burst diaphragm 26 is mounted in the housing between sample chamber 20 and deagglomerator passages 22. The diaphragm may be made of a thin sheet of any material compatible with the sample to be analyzed. It must be thin enough to rupture with the pressures to be used but must not shred or disintegrate upon rupturing, since small pieces of the diaphragm entering the column would adversely affect the analysis. Examples of such diaphragm materials are: aluminum foil, other metal foils, paper, Teflon and polyethylene. A support member 23, preferably of Teflon having an opening 25 therethrough, is mounted between the diaphragm and the sample chamber to form the lower portion of the sample chamber.

In operation, sample chamber 20 is pressurized to predetermined pressure from a pressurization source (not shown). Upon attaining the predetermined value, the pressure ruptures diaphragm 26, permitting the sample to enter the deagglomerator with negligible particle attrition and thus result in a more accurate analysis of the sample.

It should be obvious that various modifications of the feed mechanism of the present invention may occur to those skilled in the art without departing from the spirit and scope of the invention.

What is claimed is:

1. In an apparatus for indicating the particle size distribution of powder samples including a feed mechanism for directing said particles through a sedimentation tower to a sediment chamber, said feed mechanism comprising:
   (a) a housing including upper and lower sections, the upper said section forming a sample chamber disposed in communication with a source of pressure, the lower said section provided with a deagglomerator means including a first entrance passage disposed for communication with said sample chamber and a plurality of exit passages disposed in communication with said sedimentation tower;
   (b) rupturable diaphragm means mounted between said upper and lower sections for support of the sample in said sample chamber and for release thereof into said deagglomerator means responsive to pressurization of said sample chamber.

2. Apparatus as in claim 1 wherein said diaphragm is aluminum foil.

3. Apparatus as in claim 1 wherein said diaphragm is Teflon.

4. Apparatus as in claim 1 wherein said diaphragm is polyethylene.

References Cited

UNITED STATES PATENTS

| | | | |
|---|---|---|---|
| 2,597,899 | 5/1952 | Payne | 73—432 |
| 2,628,787 | 2/1953 | Payne | 73—28 X |
| 3,133,445 | 5/1964 | Richard | 73—432 |
| 3,144,773 | 8/1964 | Bramel | 73—432 |
| 3,208,286 | 9/1965 | Richard | 73—432 |

FOREIGN PATENTS

| | | |
|---|---|---|
| 136,952 | 6/1960 | U.S.S.R. |
| 188,743 | 12/1966 | U.S.S.R. |

LOUIS R. PRINCE, Primary Examiner

J. W. ROSKOS, Assistant Examiner